United States Patent [19]

Murasaki et al.

[11] Patent Number: 4,979,411
[45] Date of Patent: Dec. 25, 1990

[54] DEVICE AND METHOD FOR CUTTING SUPERFLUOUS EDGE PORTION OF INTERLAYER OF LAMINATED GLASS

[75] Inventors: Akira Murasaki, Matsusaka; Chiaki Taguchi, Hisai; Yoshiki Katada, Matsusaka, all of Japan

[73] Assignee: Central Glass Company. Limited, Ube, Japan

[21] Appl. No.: 371,120

[22] Filed: Jun. 26, 1989

[30] Foreign Application Priority Data

Jun. 27, 1988 [JP] Japan .................................. 63-158893
Dec. 21, 1988 [JP] Japan ............................ 63-165399[U]

[51] Int. Cl.⁵ .............................................. B26D 7/06
[52] U.S. Cl. ....................................... 83/156; 83/157; 83/167; 83/701; 83/929
[58] Field of Search ................. 83/56, 914, 155.1, 162, 83/167, 157, 23, 27, 102, 105, 109, 102.1, 155, 13, 701, 156, 929; 279/41 R, 42, 46 R, 48

[56] References Cited

U.S. PATENT DOCUMENTS

| | | | |
|---|---|---|---|
| 386,262 | 7/1888 | Pedersen | 279/48 |
| 3,595,453 | 7/1971 | Sherry | 225/1 |
| 3,999,453 | 12/1976 | Damast et al. | 83/22 |
| 4,207,787 | 6/1980 | Lewallyn | 83/157 |
| 4,567,797 | 2/1986 | Folk | 83/56 |
| 4,592,261 | 6/1986 | Miyaji et al. | 83/102.1 |
| 4,596,171 | 6/1986 | Gerber | 83/56 |

FOREIGN PATENT DOCUMENTS

| | | |
|---|---|---|
| 55-5812 | 1/1980 | Japan . |
| 58-157568 | 10/1983 | Japan . |
| 59-3052 | 1/1984 | Japan . |
| 60-34298 | 2/1985 | Japan . |
| 60-99600 | 6/1985 | Japan . |

Primary Examiner—Paul A. Bell
Assistant Examiner—Hwei-Siu Payer
Attorney, Agent, or Firm—Fleit, Jacobson, Cohn, Price, Holman & Stern

[57] ABSTRACT

There is disclosed a device for cutting a superfluous edge portion of an interlayer of a laminated glass. The device comprises an ultrasonic cutter including an ultrasonic generator and a cutter knife, the cutter knife being ultrasonically vibrated to cut the superfluous edge portion thereby to produce a cut part of the same; a structure for moving the ultrasonic cutter along a given way extending around the periphery of the laminated glass; and a dag holder moved together with the ultrasonic cutter and slidably carrying thereon the cut part of the superfluous edge portion to promote flowing of the cut part from the remainder of the superfluous edge portion toward a given position.

11 Claims, 3 Drawing Sheets

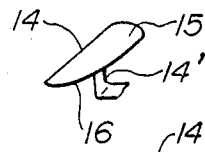
FIG. 3A
FIG. 3B
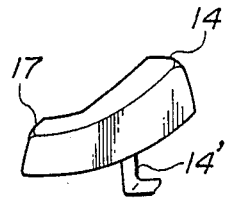
FIG. 3C
FIG. 4
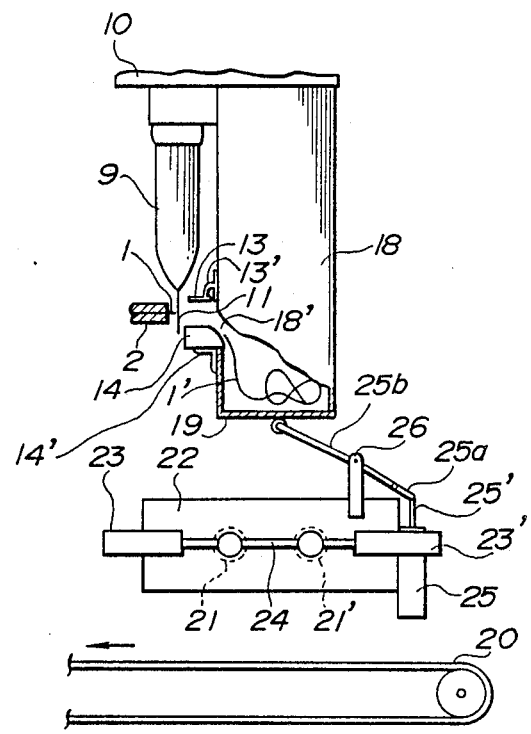

DEVICE AND METHOD FOR CUTTING SUPERFLUOUS EDGE PORTION OF INTERLAYER OF LAMINATED GLASS

BACKGROUND OF THE INVENTION

1. Field of the Invention

The present invention relates in general to a device and a method for trimming a laminated glass, and more particularly to a device and a method for cutting a superfluous edge portion (or dag) of an interlayer of the laminated glass.

2. Description of the Prior Art

A laminated glass used particularly in the field of automobile and building is produced by putting a sheet of transparent resinoid, viz., interlayer, between two sheets of plate glass, cutting a superfluous edge portion of the interlayer, and molding the whole together under heat and pressure in an autoclave.

Devices for cutting the superfluous edge portion of the interlayer are shown in Japanese Patent First Provisional Publications Nos. 59-3052 and 60-34298, which are of a type using an endless band blade (or saw). However, in the devices of this type, it is difficult to neatly cut the superfluous edge portion of the interlayer. This is because during operation of the devices, the superfluous edge portion is forced to stretch markedly in the direction in which the band blade runs. Furthermore, during operation, a considerable amount of chips is produced, which attaches to the glass pane and makes the same dirty.

While, Japanese Patent First Provisional Publication No. 60-99600 discloses a so-called "ultrasonic cutter" used for cutting flexible plastic sheets which are overlapped. In the cutter of this publication, the cutting motion of the cutter blade is produced by ultrasonic vibration. However in this publication, there is no teaching of application of such ultrasonic cutter to the field wherein cutting of a superfluous edge portion of the interlayer of laminated glass is required.

SUMMARY OF THE INVENTION

It is therefore an object of the present invention to provide a device and a method for cutting a superfluous edge portion of an interlayer of laminated glass by using an improved ultrasonic cutter.

According a first aspect of the present invention, there is provided, in a device for cutting a superfluous edge portion of an interlayer of a laminated glass, a combination which comprises an ultrasonic cutter including an ultrasonic generator and a cutter knife, the cutter knife being ultrasonically vibrated to cut the superfluous edge portion thereby to produce a cut part of the same; moving means for moving the ultrasonic cutter along a given way extending around the periphery of the laminated glass; and a dag holder moved together with the ultrasonic cutter and slidably carrying thereon the cut part of the superfluous edge portion to promote flowing of the cut part toward a given position.

According to a second aspect of the present invention, there is provided a method for cutting a superfluous edge portion of an interlayer of a laminated glass, which method comprises by steps (a) bringing a cutter knife close to a periphery of the laminated glass, (b) vibrating the cutter knife in the direction of the axis thereof satisfying a condition wherein the frequency is within a range from about 20 KHz to 40 KHz, and the amplitude is within a range from about 20 $\mu$m to about 60 $\mu$m and (c) moving the cutter knife along a given way around the laminated glass keeping the vibration.

BRIEF DESCRIPTION OF THE DRAWINGS

Objects and advantages of the present invention will become apparent from the following description when taken in conjunction with the accompanying drawings, in which:

FIGS. 3A, 3B and 3C are perspective views of various dag holders usable in the invention;

FIG. 4 is a partially broken side view of a waste container employed in the invention;

DETAILED DESCRIPTION OF THE INVENTION

Figure 1:
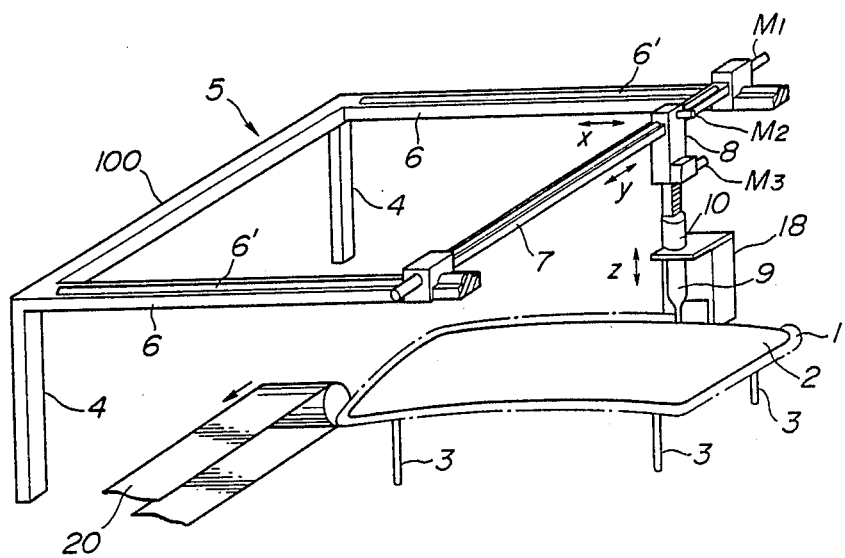
FIG. 1 is a perspective view of an arrangement of a cutting device according to the present invention.

Referring to FIG. 1, there is schematically shown an arrangement of a cutting device according to the present invention.

Designated by numeral 2 is a laminated glass which has an interlayer disposed therein. The laminated glass 2 is illustrated to have a superfluous edge portion 1 of the interlayer which is unsightly protruded from a peripheral edge of the laminated glass 2. Although not shown in the drawing, a conveyer is used for conveying the untrimmed laminated glass 2 to a given position. The laminated glass 2 is then lifted, by four lifters 3, to a predetermined vertical position, that is, to the illustrated position. Each lifter 3 has at its top a suction cap (not shown) for stably carrying the glass 2.

Mounted over the laminated glass 2 in the predetermined position is a cutter carrier structure 5 which comprises four supporting rods 4 (only two are illustrated), two parallel lateral beams 6 and two parallel side beams 100 (only one is illustrated). Denoted by numeral 7 is a cross bar which is carried on the lateral beams 6 to slide along the axes of the lateral beams 6, that is, in the direction of the reference "x". For achieving this sliding, each lateral beam 6 has a rail 6' mounted thereon, and the cross bar 7 has at each end a roller (not shown) put on the rail 6'. One of the rollers is driven by a first electric motor $M_1$ which is mounted on the cross bar 7. Thus, upon energization of the electric motor $M_1$, the cross bar 7 can run on the lateral beams 6 in the direction of "x". Of course, a pinion-rack combination may be used in place of the above-mentioned rail-roller combination.

As is seen from FIG. 1, a telescopically expandable holder 8 is carried by the cross bar 7 to slide along the same, that is, in the direction of the reference "y". For this sliding, the cross bar 7 has a rail (no numeral) mounted thereon, and the holder 8 has a roller put on the rail. The roller is driven by a second electric motor M₂.

The telescopically expandable holder 8 comprises a base part carried by the cross bar 7 and an expandable part telescopically carried by the base part. The expandable part has a rack mounted thereon, and the base part has a pinion operatively engaged with the rack. For driving the pinion, a third electric motor M₃ is mounted on the base part. Thus, when the motor M₃ is energized to rotate the pinion, the expandable part is moved in the direction of the reference "z", so that the entire length of the holder 8 is changed. The expandable part has at its leading end a cutter holder 10 pivotally connected thereto.

An ultrasonic cutter 9 is connected to the cutter holder 10. Thus, it will be appreciated that the cutter 9 can move in three-dimensional directions, that is, in the directions of "x", "y" and "z". If desired, a known powered pivotal mechanism may be arranged between the cutter holder 10 and the cutter 9.

Thus, during operation of the cutting device, the cutter 9 runs around the periphery of the laminated glass 2 while cutting the superfluous edge portion 1 of the interlayer of the laminated glass 2.

Figure 2:
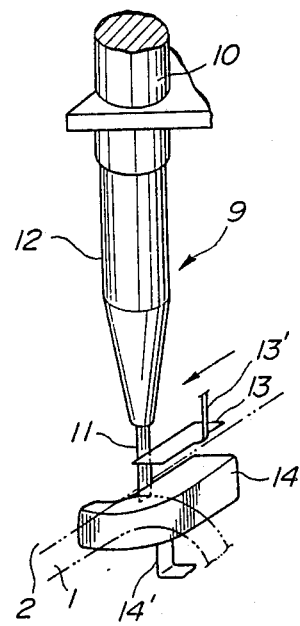
FIG. 2 is a perspective view of an ultrasonic cutter used in the invention.

As is shown in FIG. 2, the ultrasonic cutter 9 comprises generally a cutter knife 11 and an ultrasonic generator 12. When electrically energized, the ultrasonic generator 12 generates a suitable ultrasonic wave to ultrasonically vibrate the cutter knife 11 in the direction in which the edge of the knife 11 extends. The frequency and amplitude of the vibration should be controlled within a range from about 20 KHz to about 60 KHz and a range from about 20 μm to about 40 μm respectively. Examinations have revealed that when the operation of the cutter 9 is made under a condition wherein the frequency is about 40 KHz, the amplitude is about 30 μm and the moving speed of the cutter 9 is about 700 mm/sec, satisfied result is obtained.

As is seen in FIG. 2, a dag holder 14 is arranged near the cutter knife 11 to smoothly guide the flow of a cut part (or dag) of the superfluous edge portion 1 of the interlayer to an after-mentioned waste container 18 (see FIG. 4, as is shown in this drawing, the dag holder 14 is connected to the waste container 18 through a bracket 14'). The dag holder 14 is preferably constructed of a plastic, such as "nylon" (trade name), teflon (trade name) or the like, and shaped to have a generally fin-like structure. That is, the fin-like dag holder 14 is so arranged that a tapering front portion faces forward with respect to the travelling direction of the cutter 9. During travelling of the cutter 9, the dag holder 14 travels together with the cutter 9 permitting the superfluous edge portion 1 of the interlayer to slide thereon and promoting the flow cut part of the superfluous edge portion 1 toward the waste container 18. Examinations have revealed that usage of such dag holder 14 minimizes undesired waving of the superfluous edge portion 1. It has been revealed that such waving is severe when the cutter knife 11 is cut into the superfluous edge portion 1 for starting the cutting. In fact, when such waving happened, smooth cutting of the superfluous edge portion 1 was not obtained, more specifically, the cutter knife 11 was sometimes tangled with the cut part of the edge portion 1.

FIGS. 3A, 3B and 3C show various modifications of the dag holder 14. The dag holder 14 of FIG. 3A has a convex upper surface 15 and a smoothly curved outer edge 16. The dag holders 14 of FIGS. 3B and 3C are of a type which has a reduced head portion 17 bent toward the periphery of the laminated glass 2. In the case of the dag holders 14 of FIGS. 3B and 3C, it is possible to locate the top of the head portion 17 very close to the periphery of the laminated glass 2, and thus the superfluous edge portion 1 of the interlayer, which is ready for being cut, can be held substantially perpendicular to the cutter knife 11. In fact, the dag holders 14 of FIGS. 3B and 3C induced much smoother cutting of the edge portion 1 of the interlayer than the dag holder 14 of FIG. 3A.

Referring back to FIG. 2, a dag stopper 13 is arranged above the dag holder 14 to suppress or control upward movement of the cut part of the superfluous edge portion of the interlayer. As is seen from FIG. 4, the dag stopper 13 is connected to the waste container 18 through a bracket 13'.

Referring to FIG. 4, there is shown the waste container 18. As will become apparent as the description proceeds, when the container 18 is filled with the waste 1', a lower lid 19 is opened to discharge the waste therefrom.

The waste container 18 comprises a housing (no numeral) which is connected at an upper portion thereof to the cutter holder 10 (see FIG. 1). The housing is formed at a side facing the cutter knife 11 with an inlet opening 18' through which the cut part 1' of the superfluous edge portion 1 of the interlayer is introduced into the housing of the container 18. The waste container 18 has a lower lid 19 pivotally connected thereto.

Positioned below the waste container 18 is a belt conveyer 20. Thus, when the lower lid 19 is opened, the waste in the container 18 falls down by its own weight onto the belt conveyer 20 and then the waste 1' is conveyed to a predetermined position, viz., a garbage pit.

However, the light weight and elongate shape of the waste 1' are liable to cause the waste 1' to stay in the container 18 even when the lower lid 19 is opened.

In order to solve this undesired phenomenon, a so-called "waste drawer" is employed in the invention.

That is, as is seen from FIG. 4, the waste drawer is located between the waste container 18 and the belt conveyer 20 and comprises a rectangular housing 22 which has upper and lower portions opened. Opposed side walls of the housing 22 are formed with respective parallel slits 24. Two parallel rollers 21 and 21' are arranged in the housing 22 in such a manner that diametrically reduced end portions of each roller 21 or 21' are rotatably and slidably put in the slits 24 of the housing 22. The rollers 21 and 21' are driven to rotate in opposite directions by a motor (not shown). That is, the rollers 21 and 21' are rotated in clockwise and counterclockwise directions respectively in FIG. 4. Two air cylinder devices 23 and 23' are mounted on opposed portions of the housing 22, each having a piston stem connected to one of the rollers 21 and 21' through a pivot bearing. When the air cylinder devices 23 and 23' are energized, the piston stems are drawn from the cylinders bringing the associated rollers 21 and 21' close to each other. Thus, when, under this condition, the waste 1' from the waste container 18 is put between the rotating rollers 21 and 21', the same is forcedly drawn onto the belt conveyer 20 pulling the remainder of the waste 1' from the container 18.

In the invention, the opening and closing movement of the lower lid 19 of the waste container 18 is controlled by a so-called "lid opener". The lid opener comprises an air cylinder 25 having a piston stem 25', a rod including first and second opposed parts 25a and 25b and a fulcrum member 26 for the rod. The piston stem 25' is pivotally connected to the first part 25a of the rod. The second part 25b of the rod is in contact with the lower lid 19 of the waste container 18. Thus, when the air cylinder 25 is energized, the piston stem 25' is drawn from the cylinder pivoting the rod in a counterclockwise direction. Thus, in this case, the lower lid 19 is opened. While, when the air cylinder 25 is deenergized, the piston stem is drawn back into the cylinder pivoting the rod in opposite direction. Thus, in this case, the lower lid 19 is closed.

In the following, operation of the cutting device of the invention will be described with reference to the drawings.

First, as is seen from FIG. 1, an untrimmed laminated glass 2 is brought to the afore-mentioned predetermined position by using the conveyer (not shown) and the lifters 3. Then, the ultrasonic cutter 9 which has been in a predetermined rest position is energized and moved toward the peripheral portion of the laminated glass 2 making a small cut in the superfluous edge portion 1 of the interlayer of the glass 2. When the cutter knife 11 of the cutter 9 is brought to the predetermined start position, the cutter 9 is pivoted permitting the cutter knife 11 to cut the superfluous edge portion 1 around the periphery of the laminated glass 2. The moving speed of the cutter 9 is set about 700 mm/sec at straight parts of the glass 2 and about 100 mm/sec at corner parts of the same. It is to be noted that these movements of the ultrasonic cutter 6 are controlled by a microcomputer which controls the first, second and third motors $M_1$, $M_2$ and $M_3$ and the ultrasonic generator 12.

In response to the movement of the cutter 9 around the laminated glass 2, a strap-like waste 1' (viz., a cut portion of the superfluous edge portion 1 of the interlayer) is produced and introduced successively into the waste container 18 through the inlet opening 18'.

When the interior of the waste container 18 is filled with the waste 1', the lower lid 19 is opened by the lid opener. With this, the strap-like waste 1' falls onto the belt conveyor 20 through a clearance between the rollers 21 and 21' of the waste drawer. Then, the motors of the rollers 21 and 21' and the air cylinders 23 and 23' of the waste drawer are energized. With this, the rollers 21 and 21' are rotated and brought close to each other. Thus, thereafter, the strap-like waste 1' from the container 18 is forcedly drawn onto the belt conveyor 20 by the rotating rollers 21 and 21'.

If desired, the following measures may be employed in the present invention.

In order to automatically stop operation of the cutting device upon breakage of the cutter knife 11, a photoelectric sensor for sensing the breakage of the cutter knife 11 may be arranged beside the ultrasonic cutter 9.

In order to automatically operate the lid opener and the waste drawer when the waste container 18 is filled with the waste 1', a photoelectric sensor may be arranged in the waste container 18.

According to several tests of the cutting device of the present invention, the following facts have been discovered by the inventors.

Preferably, the cutter knife 11 is constructed of carbon tool steel "SK-2" and has a size of 20 to 30 mm in length, 4 to 6 mm in width and 0.3 to 0.6 mm in thickness. During operation of the ultrasonic cutter 9, attention should be payed for keeping the cutter knife 11 away from the peripheral edge of the laminated glass 2.

If the cutter knife 11 contacts the peripheral edge, considerable frictional heat is generated at the contacting portions causing breakage of the glass 2. This undesired phenomenon is solved by providing between the cutter knife 11 and the peripheral edge of the laminated glass 2 a clearance of about least 5 mm. However, if the clearance is greater than 10 mm, satisfied cutting of the superfluous edge portion 1 of the interlayer of the laminated glass 2 is not expected because in such case the surperfluous edge portion 1 becomes too flexible.

Experiments have revealed that when the cutter knife 11 is so inclined that an edge side thereof is located closer to the periphery of the laminated glass 2 than the other side thereof is, the cut part 1' of the superfluous edge portion is smoothly separated away from the periphery of the laminated glass 2. Preferably, the inclination angle of the cutter knife 11 relative to the periphery of the glass 2 is about 20 degrees.

In order to assure the cutting operation of the cutting device, it is preferable to control the frequency and amplitude of the vibration of the cutter knife 11 to satisfy the following equation.

$$700 \text{ KH}_2 \cdot \mu m \leq \text{frequency} \cdot \text{amplitude} \leq 1800 \text{ KHz} \cdot \mu m \quad (1)$$

In fact, when the cutting operation satisfies this equation, the cutting of the superfluous edge portion of the interlayer is smoothly achieved even when the interlayer is made of polyvinylbutyral and the moving speed of cutter 9 is within a range from 500 mm/sec to 1000 mm/sec.

Figure 5:
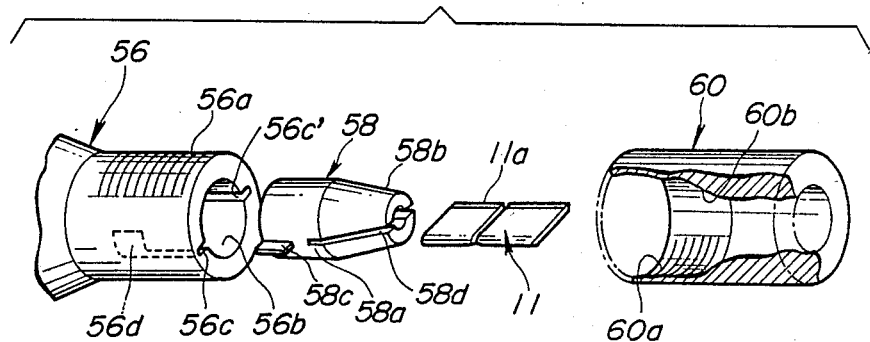
FIG. 5 is an exploded view of a part of an improved ultrasonic cutter which is usable in the invention.
Figure 6:
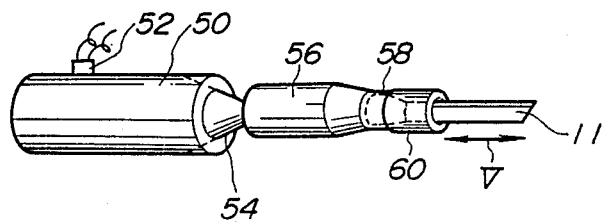
FIG. 6 is a perspective view of an entire structure of the improved ultrasonic cutter in an assembled condition.

Referring to FIGS. 5 and 6, there is shown an improved ultrasonic cutter which is usable in the cutting device of the present invention.

As is seen from FIG. 6, the ultrasonic cutter comprises an ultrasonic generator 50 having terminals 52 mounted thereon and an oscillator (not shown) mounted therein. The oscillator is of a perovskite structure type. A high frequency voltage from a power source (not shown) is supplied to the oscillator to generate a high frequency oscillation of the same. A corn 54 is connected to the oscillator and a horn 56 is connected to the corn 54. Due to provision of the corn 54 and the horn 56, the oscillation is amplified.

A holder 58 and a fastening cap 60 are employed for detachably connecting a cutter knife 11 to the horn 56. With this, upon energization of the ultrasonic generator 50, the cutter knife 11 is ultrasonically vibrated in the axial direction, that is, in the direction of the arrow denoted by reference "V".

The manner in which the cutter knife 11 is detachably fixed to the horn 56 is shown in FIG. 5. As shown, the horn 56 has a tubular end portion whose outer wall is formed with a thread groove 56a. A cylindrical inner wall 56b of the tubular end portion is formed with two longitudinally extending grooves 56c and 56c'. Each groove 56c or 56c' has at its inward end an enlarged portion 56d.

The holder 58 includes a cylindrical base portion 58a and a horned portion 58b. The base portion 58a is sized to be received in the tubular end portion of the horn 56, and has two projections 58c integral thereto. That is, when the base portion 58a is put into the tubular end portion of the horn 56 and turned clockwisely, the holder 58 becomes latched to the horn 56. The horned portion 58b is formed with an axially extending slit 58d. As shown, the holder 58 is of a tubular member having its center body merged with the slit 58d. The slit 58d of the holder 58 is so sized as to snugly catch a base end 11a of the cutter knife 11.

The fastening cap 60 is of a tubular structure, which has on its cylindrical inner wall a thread groove 60a which is operatively engageable with the thread groove 56a of the horn 56. The bore of the fastening cap 60 has a tapered wall portion 60b which, upon coupling of the cap 60 and the horn 56, abuts against the corned portion 58b of the holder 58 to assure the fixing of the cutter knife 11 to the holder 58.

In order to evaluate a knife holding characteristic possessed by the improved ultrasonic cutter, a cutting test was carried out for several days under a condition wherein the cutting device was operated for four hours in a day with the vibration frequency of the cutter knife 11 being 28 KHz, the moving speed of the cutter 9 being 700 mm/sec. For comparison, one conventional ultrasonic cutter as shown in FIG. 7 was also subjected to the test.

The conventional cutter comprises a horn 100 which has a tubular end portion 100a, and a cylindrical holder 102 which has an axially extending slit 102a. The slit 102a is sized to snugly catch the base portion 11a of the cutter knife 11. The tubular end portion 100a of the horn 100 has a threaded bore 100b at its bottom, and the holder 102 has at one end a threaded bolt portion 102b. For assembly, the base portion 11a of the cutter knife 11 is snugly received in the slit 102a of the holder 102, then the holder 102 is put into the tubular end portion 100a, and then the holder 102 is turned about its axis along with the cutter knife 11 to achieve a threaded connection between the bolt 102b and the threaded bore 100b.

Figure 7:
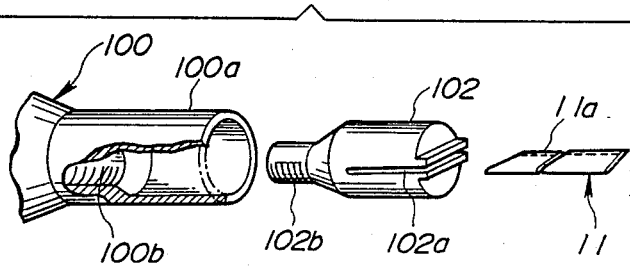
FIG. 7 is a view similar to FIG. 5, but showing a conventional ultrasonic cutter.
Figure 8B:
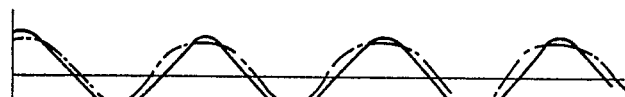
FIG. 8 is a graph showing the forms of vibration waves which are provided respectively by the modified cutter and the conventional cutter during their cutting operation.
Figure 8A:
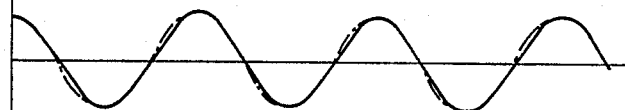

The results of the test are shown by FIG. 8 which is an image of an oscillograph, showing vibration waves possessed by the cutter knives which are respectively held by the improved cutter of FIG. 6 and the conventional cutter of FIG. 7. The waves denoted by references "A" and "B" are the results of the improved one and the conventional one respectively. The waves illustrated by solid lines show the initial characteristic of the vibrations, while the waves illustrated by a phantom line show the results after five days later. As will be easily understood from these oscillographic waves, in case of the improved cutter of FIG. 6, the change in amplitude is quite small as compared with that of the conventional one. This means that in the improved one, the knife holding characteristic is superior to the conventional one. Furthermore, due to its inherent construction, changing of the cutter knife 11 is easily carried out in the improved one.

What is claimed is:

1. In a device for cutting a superfluous edge portion of an interlayer of a laminated glass,
   an ultrasonic cutter including an ultrasonic generator and a cutter knife, said cutter knife being ultrasonically vibrated to cut said superfluous edge portion thereby to produce a cut part of the same;
   moving means for moving said ultrasonic cutter along a given way extending around the periphery of said laminated glass;
   a dag holder moved together with said ultrasonic cutter and slidably carrying thereon said cut part of said superfluous edge portion to promote flowing of said cut part from the remainder of the superfluous edge portion toward a given position; and
   a waste container moved together with said ultrasonic cutter and comprising a housing which has an inlet opening through which said cut part is introduced into the housing, and a pivotal lid which is pivotally connected to a lower open portion of said housing, said housing having said dag holder connected thereto through a bracket.

2. A device as claimed in claim 1, which said dag holder is shaped like a fin, said dag holder being so arranged that a tapering front portion is directed forward with respect to the direction in which said ultrasonic cutter advances.

3. A device as claimed in Claim 2, in which said dag holder is constructed of a smoothed solid plastic.

4. A device as claimed in Claim 3, in which said dag holder has a convex upper surface and a smoothly curved outer edge.

5. A device as claimed in Claim 3, in which said dag holder has a smaller head portion bent generally perpendicular to said given way of said ultrasonic cutter.

6. A device as claimed in claim 1, further comprising a lid opener which opens and closes said pivotal lid, said lid opener being driven by an air cylinder.

7. A device as claimed in claim 6, further comprising a waste drawer which forcibly discharges the waste contained in said waste container upon opening of said pivotal lid.

8. A device as claimed in claim 7, in which said waste drawer comprises two rollers which are arranged to rotate in opposite directions and to move toward and away each other.

9. A device as claimed in claim 1, in which said ultrasonic cutter comprises:
   an ultrasonic generator;
   a corn connected to the ultrasonic generator;
   a horn connected to said corn;
   a holder detachably connected to said horn, said holder having a corned portion which is formed with a slit, said slit being so sized as to snugly catch a base portion of said cutter knife; and
   a fastening cap having a bore formed therein, said bore having a portion defined by a tapered inner wall portion, said tapered inner wall being brought into abutment with said corned portion of said holder upon coupling of said fastening cap and said horn.

10. A device as claimed in claim 9, in which said horn has a bore which is sized to snugly receive said holder, in which said horn has about its cylindrical outer wall a thread groove and in which said fastening cap has on its cylindrical inner wall a thread groove which is operatively engageably with the thread grove of said horn.

11. A device as claimed in claim 10, in which said bore of said horn is formed at the inner wall with axially extending grooves each having an inward end enlarged, and in which said holder is formed with two projections, said projections being slidably engaged with said axially extending grooves of said horn and latchingly engaged with the enlarged end portions of the grooves.

* * * * *